(12) United States Patent
Buschmann et al.

(10) Patent No.: US 8,488,309 B2
(45) Date of Patent: Jul. 16, 2013

(54) LOCKING MECHANISM

(75) Inventors: Ulrich Buschmann, Rammingen (DE); Christian Mayer, Ulm (DE)

(73) Assignee: Nokia Corporation, Espoo (FI)

( * ) Notice: Subject to any disclaimer, the term of this patent is extended or adjusted under 35 U.S.C. 154(b) by 373 days.

(21) Appl. No.: 12/759,951

(22) Filed: Apr. 14, 2010

(65) Prior Publication Data

US 2011/0255216 A1 Oct. 20, 2011

(51) Int. Cl.
*H05K 5/00* (2006.01)
*H05K 7/00* (2006.01)
*G06F 1/16* (2006.01)

(52) U.S. Cl.
USPC .............. 361/679.3; 361/679.55; 361/679.56; 361/679.58

(58) Field of Classification Search
USPC ................ 361/679.3, 679.55, 679.56, 679.58
See application file for complete search history.

(56) References Cited

U.S. PATENT DOCUMENTS

| | | | |
|---|---|---|---|
| 6,137,960 A | 10/2000 | Komatsuzaki et al. | |
| 6,407,912 B1 * | 6/2002 | Chen et al. | 361/679.58 |
| 7,325,846 B2 * | 2/2008 | Smith et al. | 292/336.3 |
| 7,606,022 B2 * | 10/2009 | Kim | 361/679.01 |
| 7,855,884 B2 * | 12/2010 | Dong | 361/679.58 |
| 8,023,259 B2 * | 9/2011 | Lam et al. | 361/679.37 |
| 2003/0022633 A1 | 1/2003 | Chen | |
| 2004/0264955 A1 | 12/2004 | Fujii | |
| 2006/0171109 A1 * | 8/2006 | Chang | 361/685 |
| 2010/0081045 A1 | 4/2010 | Li | |

FOREIGN PATENT DOCUMENTS

JP 2007335201 12/2007

OTHER PUBLICATIONS

International Search Report of International Application No. PCT/FI2011/050312—Date of Completion of Search: Aug. 12, 2011, 5 pages.

* cited by examiner

*Primary Examiner* — Anthony Haughton
(74) *Attorney, Agent, or Firm* — Locke Lord LLP

(57) ABSTRACT

An apparatus including a body part configured to receive a replaceable internal part, a first cover part configured to be movable between an open position and a closed position, a second cover part configured to be movable between an open position and a closed position, and when in said closed position, to cover the replaceable internal part. A locking mechanism is configured to lock the second cover part to the body part and the locking mechanism is configured to be releasable, when the first cover part is in said open position and the locking mechanism is configured to be unreleasable, when the first cover part is in said closed position.

20 Claims, 4 Drawing Sheets

LOCKING MECHANISM

TECHNICAL FIELD

The present invention generally relates to a locking mechanism for a cover. The invention relates particularly, though not exclusively, to releasing of a battery cover of an electronic apparatus.

BACKGROUND ART

Presently, apparatuses with releasable covers are known. Typically, latching mechanisms are used to allow a user to releasably attach and engage a cover to an electronic apparatus. For example, latching elements are used on removable battery covers to allow a user to conveniently replace a battery of an electronic apparatus. A button or lever that protrudes through the exterior of the device and is visible to the user even when not needed. The battery of the electronic apparatus may be placed in a separate battery chamber in the apparatus. A cover part is provided to protect and lock the battery in its chamber.

SUMMARY

According to a first example aspect of the invention there is provided an apparatus comprising:
 a body part configured to receive a replaceable internal part;
 a first cover part configured to be movable between an open position and a closed position;
 a second cover part configured to be movable between an open position and a closed position, and when in said closed position, to cover the replaceable internal part;
 a locking mechanism configured to lock the second cover part to the body part;
 the locking mechanism configured to be releasable, when the first cover part is in said open position; and
 the locking mechanism configured to be unreleasable, when the first cover part is in said closed position.

The apparatus may be an electronic device. The apparatus may be a battery-operated device. The apparatus may be a mobile handheld electronic device. The apparatus may be a mobile communication device, such as a cellular mobile station, mobile phone, navigation device, multimedia device, game device, electronic book reading device, and/or the like.

The apparatus may further comprise a switch configured to be revealed when the first cover part is in said open position, wherein the locking mechanism is configured to be released in response to actuating the switch. The first cover part may be configured to prevent the switch from moving when the first cover part is in said closed position.

The locking mechanism may comprise a latch that is engaged to a groove in the first cover part when the first cover part is in said closed position. The locking mechanism may also comprise a spring configured to force the latch against the groove in the second cover part when the second cover part is in said closed position. The groove may be located in a cover support and the cover support may be attached to the second cover part or integrated to the second cover part.

The locking mechanism may comprise a lever that is configured to actuate the second cover part when the second cover part is in said open position. The locking mechanism may also comprise a notch that is configured to engage to a pin in the body part limiting the actuation of the locking mechanism.

The first cover part, when in closed position, may be configured to cover the replaceable internal part, an electrical or optical interface. The replaceable internal part may be a battery, an identity module or a memory card.

The apparatus may further comprise an additional locking mechanism that is configured to lock the second cover part to the bottom body part when the second cover part is in said closed position. The additional locking mechanism may comprise a first form-locking member in the internal surface of the second cover part configured to inter-lock to a second form-locking member in the bottom body part when the second cover part is in said closed position. The first form-locking member may be a plug in the second cover part and the second form-locking member may be an aperture in the bottom body part.

According to a second example aspect there is provided a method comprising:
 providing an apparatus with a body part configured to receive a replaceable internal part;
 configuring a first cover part to be movable between an open position and a closed position;
 configuring a second cover part to be movable between an open position and a closed position, and when in said closed position, to cover the replaceable internal part;
 further providing a locking mechanism configured to lock the second cover part to the body part; and
 configuring the locking mechanism to be releasable, when the first cover part is in said open position; and unreleasable, when the first cover part is in said closed position.

The method may comprise further providing a switch configured to be revealed when the first cover part is in said open position, wherein the locking mechanism is configured to be released in response to actuating the switch.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1A:
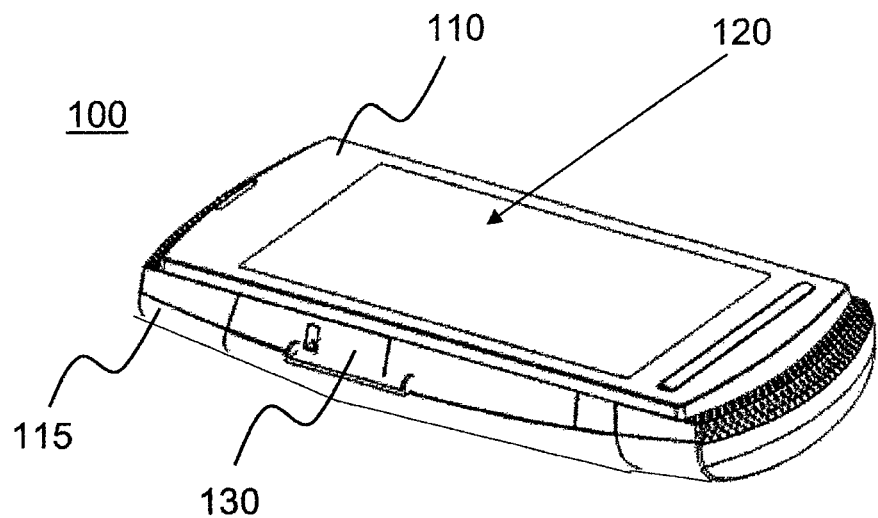
FIG. 1a shows a schematic picture of an apparatus in an operating position from front view according to an example embodiment of the invention.

FIG. 1a shows a schematic picture of an apparatus 100 according to an example embodiment of the invention. In this example, the apparatus 100 is a mobile handheld electronic device. In FIG. 1a the apparatus 100 is shown in such a way that the front of the apparatus 100 is upwards. The apparatus 100 comprises at least one body part 110 and at least a first cover part 130. In an embodiment, the body part 110 may also comprise a display 120 and an input element (not shown), such as a keyboard or a keypad. The display may be, for example, a touch display. The input element may be, for example, a full qwerty or ITU-T keyboard or a smaller keypad with limited keys. It may be a touch screen as well.

In an example embodiment of the invention, the apparatus 100 contains several body parts, Such as a front body part 110 and a bottom body part 115. The apparatus 100 may also comprise a slide mechanism (not shown) or a flip mechanism (not shown) allowing the front body part 110 to slide or flip from a first position to a second position. The body parts 110, 115 may form a bottom or front cover of the apparatus 100. One body part 110, 115, for example a bottom body part 115, may also comprise separate blocks, like an upper block, a lower block and a side block.

Figure 1B:
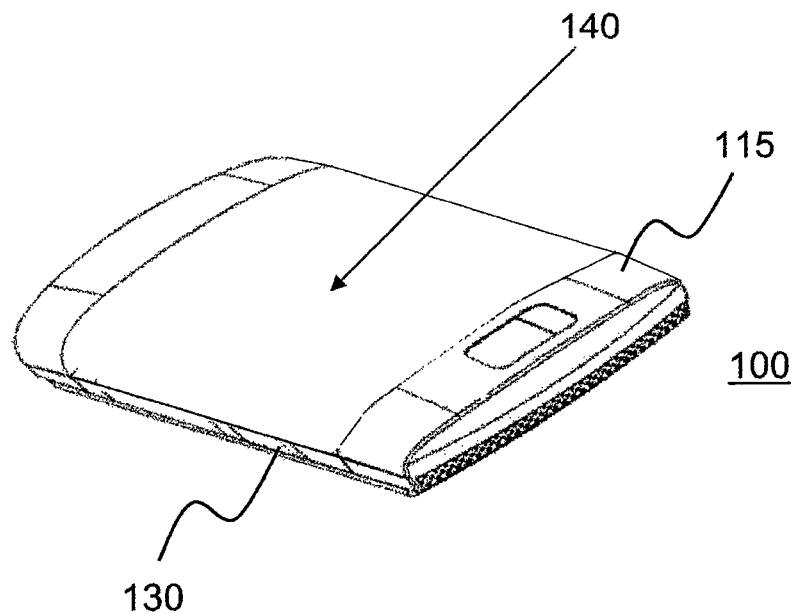
FIG. 1b shows a schematic picture of an apparatus in an operating position from bottom view according to an example embodiment of the invention.

In an example embodiment of the invention, the apparatus 100 further comprises a second cover part 140 showed in FIG. 1b. The apparatus 100 is shown in such a way that the bottom of the apparatus 100 is upwards.

The first cover part 130 or the second cover part 140 may protect a replaceable internal part, such as a battery, of the apparatus 100. Another replaceable internal part may be a subscriber identity module (SIM) or a memory card, for example. The covering of the replaceable internal part also reduces the risk of accidental removal of the replaceable internal part by a user. The first cover part 130 or the second cover part 140 may also protect an electrical or optical interface, for example infrared (IR) port, a headset jack, an universal serial bus (USB) port, recommended standard 232 (RS-232) connector or high definition multimedia interface (HDMI). Other elements covered by the first cover part 130 or the second cover part 140 may be accessory contacts, slots or ports, a charging socket and/or a storage recess for a stylus.

Figure 2:
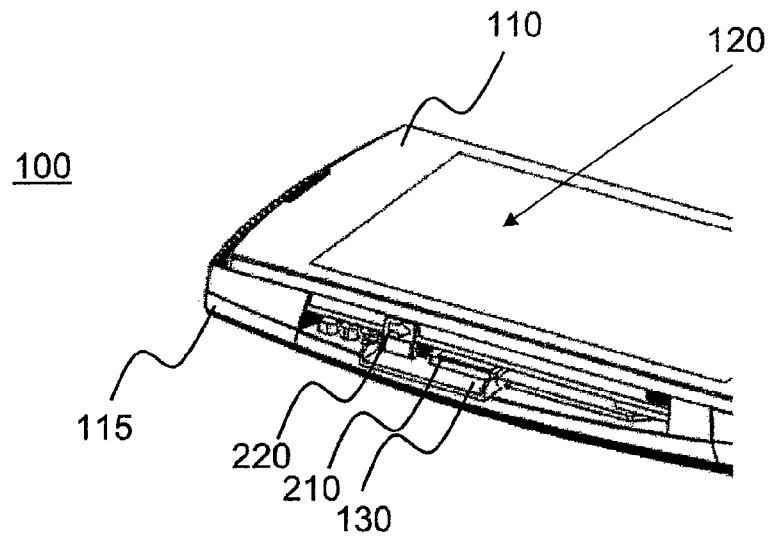
FIG. 2 shows a schematic picture of an apparatus in a more detailed operating position according to an example embodiment of the invention.

FIG. 2 shows a schematic picture of an apparatus 100 in a more detailed operating position according to an embodiment of the invention. The apparatus 100 is shown in such a way that the front of the apparatus 100 is upwards and the display 120 is visible to the user. In FIG. 2 the first cover part 130 is in an open mode revealing underneath a replaceable element 210 that is a memory card. Additionally under the first cover part 130 is placed a release switch 220. By activating the release switch 220 the second cover part 140 can be opened without having the switch 220 visible in normal operating mode. The release switch 220 may also contain an arrow indicating the opening direction. Typically, the first cover part 130 is placed on a sidewall of the apparatus 100 as in the FIG. 2. However, the first cover part 130 may also be placed on the bottom body part 115 or the front body part 110 or any other part of the apparatus 100 suitable for the opening mechanism of the second cover part 140.

In an example embodiment of the invention, the first cover part 130 comprises a hinge to open like a door revealing the interior. However, the first cover part 130 may also comprise a slide mechanism that slides between an open and a closed state. Furthermore, the first cover part 130 may also be a combination of these two mechanisms where the locking/unlocking function of the first cover part 130 is arranged by the sliding movement and the opening/closing function of the first cover part 130 is arranged by the hinge movement.

Figure 3:
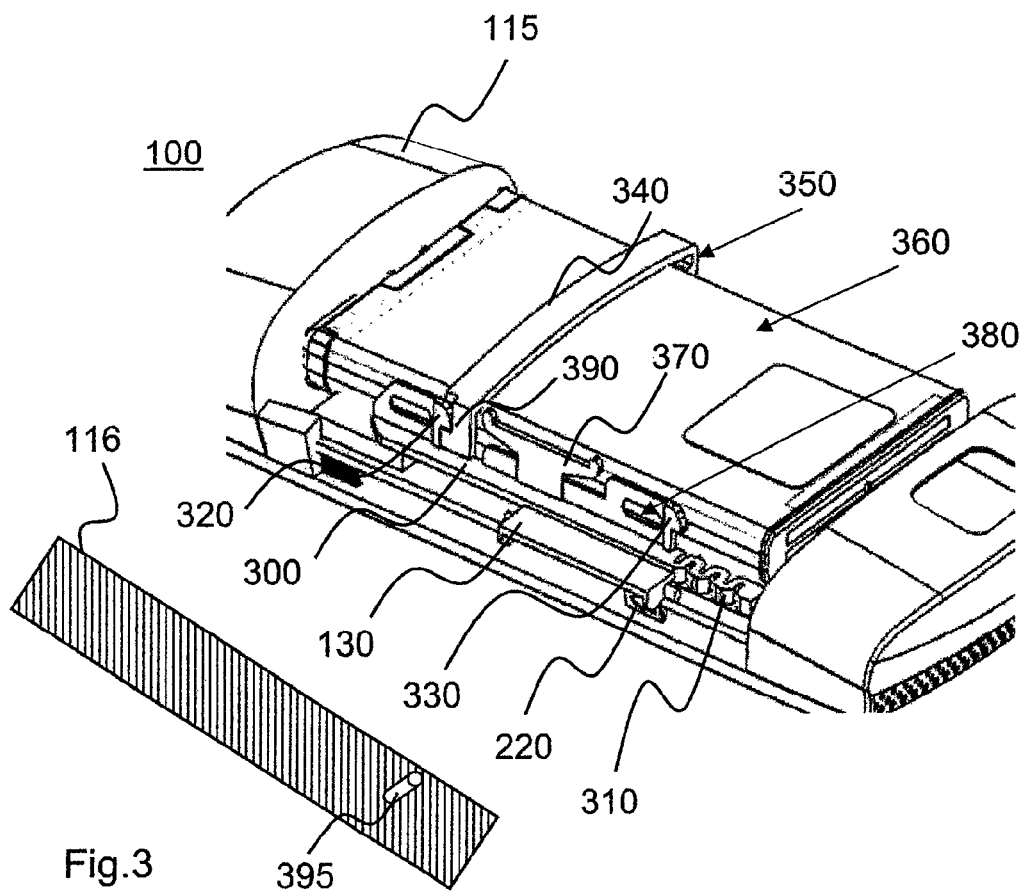
FIG. 3 shows a schematic picture of an apparatus in a more detailed operating position for the cover opening mechanism according to an example embodiment of the invention.

FIG. 3 shows a schematic picture of an apparatus 100 in a more detailed operating position for the cover opening mechanism according to an embodiment of the invention. The second cover part 140 of FIG. 1b is removed. Parts of the front body part 110 and bottom body part 115 are not shown for the sake of clarity to better highlight the opening mechanism of the second cover part 140.

In an example embodiment of the invention, the first cover part 130 is in an open mode. Under the first cover part 130 there is revealed the release switch 220. The release switch 220 is functionally connected to a frame 300 of the release mechanism. The frame 300 moves in the direction of the movement of the release switch 220 actuated by the user. A reset spring 310 is functionally connected to the frame 300 for maintaining the release mechanism in a closed mode when the user does not actuate the release switch 220. The reset spring 310 may be an integrated spring as shown in FIG. 3 or a distinct spring. The reset spring 310 may comprise metal, rubber and/or any elastic material that provides a desired spring force.

In an example embodiment of the invention, the moving frame 300 of the release mechanism comprises at least one latch 320. A second latch 330 may be included to improve the locking feature if needed. Further latches may be provided depending on the mechanism. The second cover part 140 is not shown in FIG. 3 but a cover support 340 is illustrated. The cover support 340 may be attached as a separate element to the internal surface of second cover part 140 for locking purposes. In another example embodiment of the invention the cover support 340 is integrated to the second cover part 140. The latch 320, 330 engages to the cover support 340 that comprises a groove 390 in the end of the cover support 340 matching to the latch 320, 330 and ensuring locking of the second cover part 140 to the body part 115 of the apparatus 100.

In an example embodiment of the invention, the cover support 340 comprises a locking member in the opposite end 350 of the cover support 340. This locking member may be for example a hook-in shape in the cover support 340 or the second cover part 140. The hook-in shape may be engaged to appropriate groove in the body part 110, 115. When closing the second cover part 140, the hook-in shaped end of the second cover part 140 is engaged first. Thereafter the opposite end of the second cover part 140 is pushed downwards to engage the latch 320, 330 to the groove 390.

In an example embodiment of the invention, the actuating of the release switch 220 also comprises a signal generation for controlling of the apparatus 100. The apparatus 100 may be configured to switch off power in response to said actuating of the release switch 220. This may be useful for example in a situation where the second cover part 140 covers a battery 360, an identity card or a memory card. When the user actuates the release switch 220 under the first cover part 130 aiming to open the second cover part 140, the apparatus 100 can switch off power or save open processes before the removal of the battery 360.

In an example embodiment of the invention, the locking mechanism 300 comprises a notch 380 configured to engage to a pin 395 in the body part 110, 115, 116 limiting the actuation of the locking mechanism 300. Body part 116 may be an integral part of the front body part 110 or the bottom body part 115. It is also possible that the body part 116 is a separate body part on the side of the apparatus 100.

In an example embodiment of the invention, the locking mechanism 300 comprises a lever 370 configured to actuate the second cover part 140 when the second cover part 140 is in said open position. This lever 370 pushes the second cover part 140 outwards and helps the user to open the cover part 130

Figure 4:
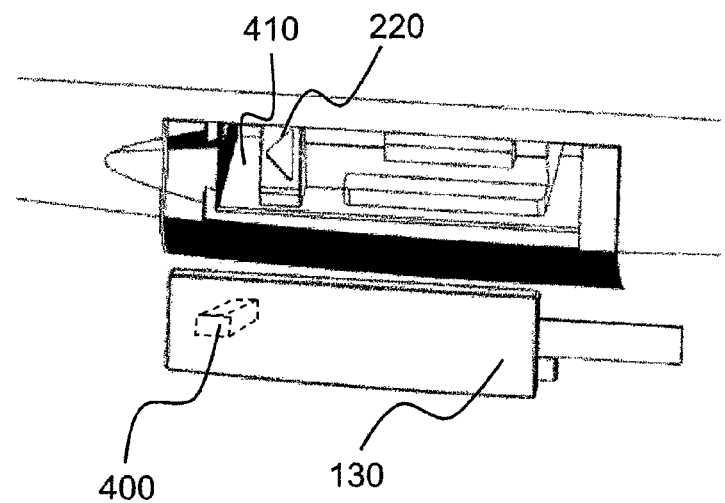
FIG. 4 shows a schematic picture of an apparatus in a more detailed operating position for an example embodiment of the invention for the cover opening mechanism.

FIG. 4 shows a schematic picture of an apparatus in a more detailed operating position for an example embodiment for the cover opening mechanism. The first cover part 130 is configured to prevent the switch 220 actuating when the first cover part 130 is in said closed position. A rib 400 may be placed at the inside surface of the first cover part 130. When the first cover part 130 is in closed position, the rib 400 is received in the slot 410 next to the switch 220 and may block the movement of the switch 220. The accidental opening of the second cover part 140 may thus be restrained in the case that the apparatus 100 is dropped or faces other sudden impacts.

Figure 5:
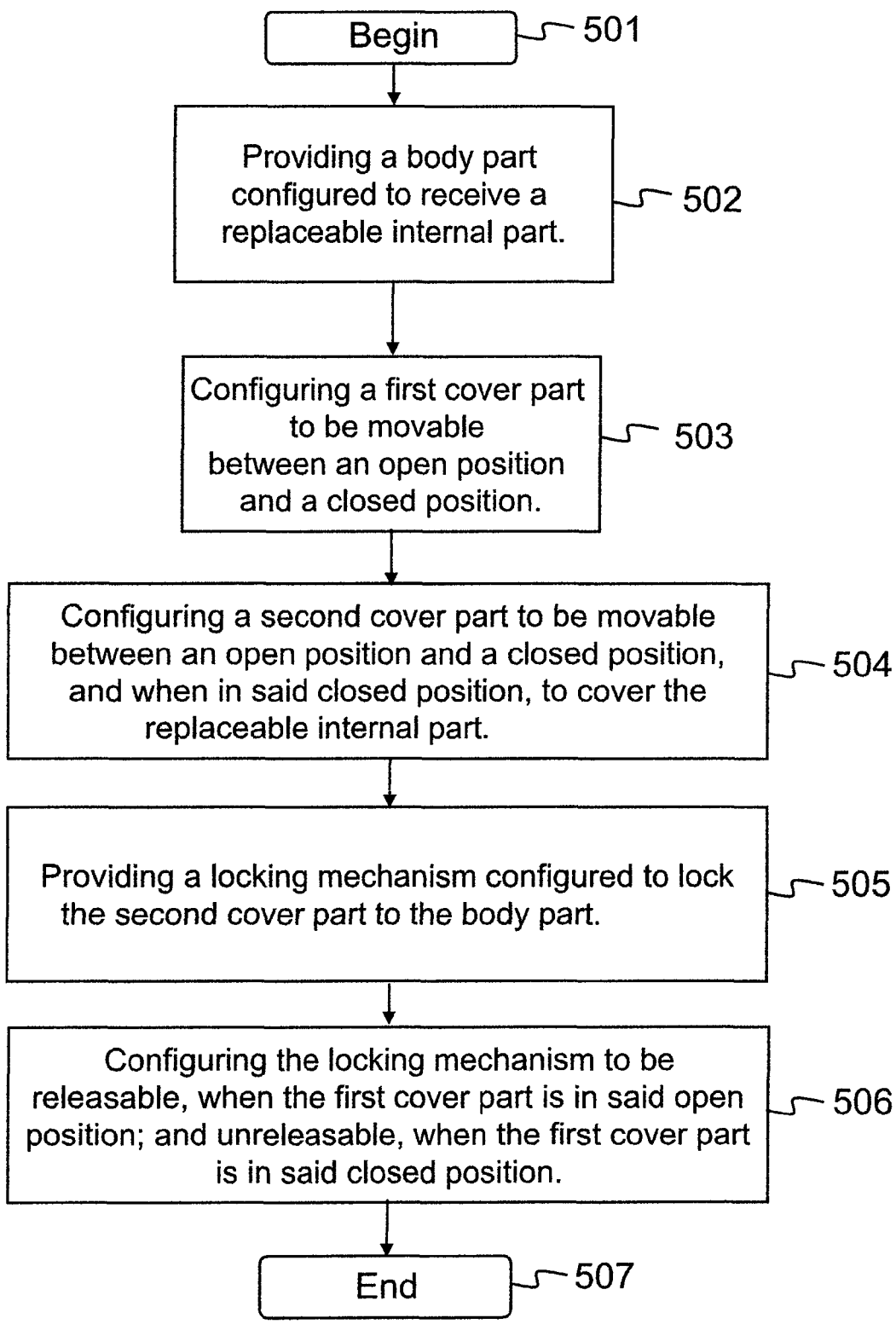
FIG. 5 shows a flow chart of a method in accordance with an example embodiment of the invention.

FIG. 5 shows an example flow chart of a method in accordance with an example embodiment of the invention. The method begins at block 501. In block 502, a body part configured to receive a replaceable internal part is provided. In block 503, a first cover part is configured to be movable between an open position and a closed position. In block 504, a second cover part is configured to be movable between an open position and a closed position. When the second cover part is in closed position, it covers the replaceable internal part. Locking mechanism configured to lock the second cover part to the body part is provided in block 505. In block 506, the locking mechanism is configured to be releasable, when the first cover is in said open position and unreleasable, when the first cover part is in said closed position. The method ends at block 507. The example method presented in the foregoing is an example only. In other embodiments, different functions in the method may occur in a mutually different order.

Figure 6:
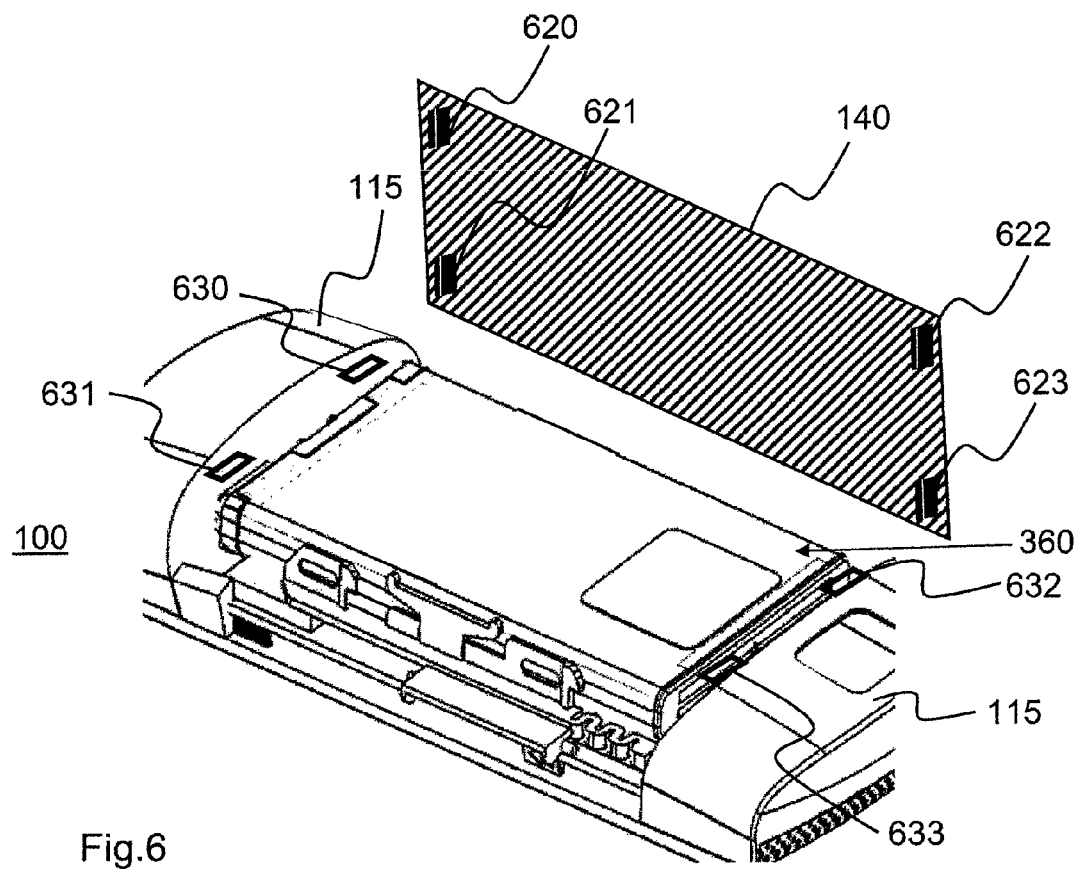
FIG. 6 shows a schematic picture of an apparatus in a more detailed operating position for an example embodiment of the invention for an additional locking mechanism.

FIG. 6 shows a schematic picture of an apparatus 100 in a more detailed operating position for an example embodiment of the invention for an additional locking mechanism. The bottom body part 115 may be locked utilizing an additional locking mechanism comprising form-locking members 620, 621, 622, 623, 630, 631, 632, 633 to the second cover part 140.

In an example embodiment of the invention, at least one plug 620, 621, 622, 623 is placed in the internal surface of the second cover part 140. At least one aperture 630, 631, 632, 633 that is matching to the at least one plug 620, 621, 622, 623 is placed to the bottom body part 115. The at least one aperture 630, 631, 632, 633 may be placed in the surface towards the replaceable internal part 360, for example the battery, to such position that when the second cover part 140 is in closed position the plug 620, 621, 622, 623 extends through the aperture 630, 631, 632, 633. When using this kind of additional locking feature, it is possible to prevent body parts 110, 115 or body part blocks to lose when the apparatus 100 is accidentally dropped by the user. Number of plugs/apertures included in the additional locking feature may depend on the implementation. In FIG. 6, there are altogether four plugs/apertures as form-locking members used. The plugs 620, 621 and the apertures 630, 631 lock the lower block of the bottom body part 115 when the second cover part 140 is in closed position. The plugs 622, 623 and the apertures 632, 633 lock the upper block of the bottom body part 115 when the second cover part 140 is in closed position.

Various example embodiments presented in the foregoing may help in designing an apparatus. An apparatus having no separate cover locking buttons or switches on the external surface of the apparatus may be provided. An apparatus with a seamless design may be provided. A user may change a battery and any other applicable user replaceable internal part of the apparatus conveniently. An apparatus that reduces the risk of accidental opening of the cover, for example battery cover, may be provided. The battery of the device may be switched off while opening the cover for internal part replacement.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. An apparatus comprising:
   a body part configured to receive a replaceable internal part;
   a first cover part, placed on an external surface of the body part of the apparatus, configured to be movable between an open position and a closed position;
   a second cover part, on an external surface of the apparatus, configured to be movable between an open position and a closed position, and when in said closed position, to cover the replaceable internal part;
   a locking mechanism configured to lock the second cover part to the body part;
   the locking mechanism configured to be releasable, when the first cover part is in said open position; and
   the locking mechanism configured to be unreleasable, when the first cover part is in said closed position.

2. An apparatus according to claim 1, further comprising a switch configured to be revealed when the first cover part is in said open position, wherein the locking mechanism is configured to be released in response to actuating the switch.

3. An apparatus according to claim 2, wherein the first cover part is configured to prevent the switch from moving when the first cover part is in said closed position.

4. An apparatus according to claim 1, wherein the locking mechanism comprises a latch engaged to a groove in the second cover part when the second cover part is in said closed position.

5. An apparatus according to claim 4, wherein the groove is in a cover support, the cover support being attached to the second cover part.

6. An apparatus according to claim 4, wherein the groove is in a cover support, the cover support being integrated to the second cover part.

7. An apparatus according to claim 4, wherein the locking mechanism comprises a spring configured to force the latch against the groove in the second cover part when the second cover part is in said closed position.

8. An apparatus according to claim 1, wherein the locking mechanism comprises a lever configured to actuate the second cover part when the second cover part is in said open position.

9. An apparatus according to claim 1, wherein the locking mechanism comprises a notch configured to engage to a pin in the body part limiting the actuation of the locking mechanism.

10. An apparatus according to claim 1, wherein the first cover part, when in closed position, is configured to cover the replaceable internal part.

11. An apparatus according to claim 1, wherein the first cover part, when in closed position, is configured to cover an electrical or optical interface.

12. An apparatus according to claim 1, wherein the replaceable internal part is a battery.

13. An apparatus according to claim 1, wherein the replaceable internal part is an identity module.

14. An apparatus according to claim 1, wherein the replaceable internal part is a memory card.

15. An apparatus according to claim 1, wherein the apparatus is a mobile handheld electronic device.

16. An apparatus according to claim 1, further comprising an additional locking mechanism configured to lock the second cover part to the bottom body part when the second cover part is in said closed position.

17. An apparatus according to claim 16, wherein the additional locking mechanism comprises a first form-locking member in the internal surface of the second cover part configured to inter-lock to a second form-locking member in the bottom body part when the second cover part is in said closed position.

18. An apparatus according to claim 17, wherein the first form-locking member is a plug in the second cover part and the second form-locking member is an aperture in the bottom body part.

19. A method comprising:
providing an apparatus with a body part configured to receive a replaceable internal part;
configuring a first cover part, placed on an external surface of the body part of the apparatus, to be movable between an open position and a closed position;
configuring a second cover part, on an external surface of the apparatus, to be movable between an open position and a closed position, and when in said closed position, to cover the replaceable internal part;
further providing a locking mechanism configured to lock the second cover part to the body part; and
configuring the locking mechanism to be releasable, when the first cover part is in said open position; and unreleasable, when the first cover part is in said closed position.

20. A method according to claim 19, further providing a switch configured to be revealed when the first cover part is in said open position, wherein the locking mechanism is configured to be released in response to actuating the switch.

* * * * *